United States Patent [19]

Kornylak

[11] 4,252,512
[45] Feb. 24, 1981

[54] COANDA EFFECT SUPPORT FOR MATERIAL PROCESSING

[75] Inventor: Thomas A. Kornylak, Hamilton, Ohio

[73] Assignee: Kornylak Corporation, Hamilton, Ohio

[21] Appl. No.: 963,653

[22] Filed: Nov. 24, 1978

[51] Int. Cl.³ .................. B29C 1/04; B29D 27/04
[52] U.S. Cl. ............................. 425/89; 137/803; 239/521; 264/45.8; 425/224; 425/817 C; 425/DIG. 2
[58] Field of Search .............. 425/4 C, 817 C, 107, 425/DIG. 2, 174.2, 90, 96, 101, 22, 89; 264/45.8, DIG. 9, DIG. 51, 51, 53; 137/803, 814, 815, 816; 239/521; 34/57 R, 57 C

[56] References Cited

U.S. PATENT DOCUMENTS

| 2,052,869 | 9/1936 | Coanda | 239/521 X |
|---|---|---|---|
| 2,909,804 | 10/1959 | Means | 425/107 |
| 3,002,700 | 10/1961 | Mohring | 239/521 X |
| 3,236,517 | 2/1966 | Lyman | 137/815 X |
| 3,240,846 | 3/1966 | Voelker | 425/115 X |
| 3,261,162 | 7/1966 | Coanda | 60/269 |
| 3,340,795 | 9/1967 | Hartley | 156/289 X |
| 3,367,581 | 2/1968 | Kizilos et al. | 137/814 |
| 3,394,463 | 7/1968 | Futer | 37/57 C X |
| 3,408,690 | 11/1968 | Jacob | 425/371 X |
| 3,555,693 | 1/1971 | Futer | 34/57 C |
| 3,594,461 | 7/1971 | Jacob | 425/371 X |
| 3,617,594 | 11/1971 | Willy | 425/115 X |
| 3,816,043 | 6/1974 | Snelling et al. | 425/4 C |
| 3,821,342 | 6/1974 | Hurd | 264/DIG. 9 |
| 3,838,523 | 10/1974 | Hurd | 34/57 B X |
| 3,860,371 | 1/1975 | Willy | 264/45.3 X |
| 3,888,608 | 6/1975 | Holl | 425/817 R X |
| 3,973,893 | 8/1976 | Camp | 425/174.2 X |
| 3,981,666 | 9/1976 | Wadman | 425/DIG. 2 |
| 3,992,135 | 11/1976 | Camp | 425/174.2 |
| 4,008,030 | 2/1977 | Ampler | 425/817 C X |

FOREIGN PATENT DOCUMENTS 51-68674  6/1976  Japan .................. 425/817 C

OTHER PUBLICATIONS

Streeter, Victor L., "Fluid Mechanics," Second Edition, New York, McGraw-Hill, 1958, Title Page, pp. 161, 169.
Mitchell, A. E., "Fluid Oscillator," IBM Technical Disclosure Bulletin, vol. 5, No. 6, Nov. 1962, p. 25.
Chemical Engineering, "What's in Store for Fluid Amplifiers,?" May 8, 1967, pp. 94, 96 and 98.
"Concise Chemical and Technical Dictionary," Third Enlarged Edition, H. Bennett, Editor, New York, Chemical Publishing Co., Inc., 1974, p. 261.

Primary Examiner—Philip Anderson
Attorney, Agent, or Firm—Thomas E. Beall, Jr.

[57] ABSTRACT

A conveying and supporting surface is provided with a plurality of coanda effect nozzles for providing a directional film of gas along the surface to support and/or convey a plurality of articles, in indefinite length web, or material along the surface. The directional coanda effect nozzles will produce a conveying film of gas and a film of gas that will produce a suction spaced from the surface to hold the articles closely adjacent the surface while at the same time produce an air bearing to prevent the articles or web material from contacting the surface.

10 Claims, 6 Drawing Figures

COANDA EFFECT SUPPORT FOR MATERIAL PROCESSING

BACKGROUND OF THE INVENTION

In many material processing apparatus and methods, it is necessary to support material against gravity, from either above or below the item, to treat the material with a fluid, particularly a gas, or convey the material, or any combination, with the material being individual articles, continuous webs, or the like. For example, in paper making, it is necessary to support and move continuous webs of paper and simultaneously dry the paper with air impinging upon the paper. Further, in the manufacture of continuous lengths of synthetic resin foam, it is necessary to support and convey the foam material during its expansion and curing. The present apparatus may be used to directly support and convey the foam, or indirectly support and convey the foam through the intermediary cover sheet, which may be paper.

In the past, belt conveyors have been used to support and convey material, air bearings have been used to support material, and rigid fixed surfaces have been used to support material.

SUMMARY

In the present invention, a controlled film of gas is formed by a plurality of coanda effect nozzles and used for any one of the purposes of supporting material on the film as an air bearing, supporting the material beneath the film using the suction powers of the moving film, supporting the material against contact with a backing surface using the air bearing qualities of the film, treating material with the specific fluid of the film, or conveying the material in a predominate direction of movement of the film, with the material being individual articles, planar or shaped, individual sheets of material, or indefinite length sheets of material, with such sheets being for example, paper, metal foil, metal sheets such as aluminum, steel, or brass, plastic film or sheets, fabric, synthetic resin foam, synthetic or natural rubber foam or solid sheets, plywood, cork board, fiber board, or the like. As specific examples of coanda effect nozzles provided on the surface, the surface may be machined so as to form the air guide surfaces along a slot in the plate forming the surface, or the plate forming the surface may be drilled with a plurality of bores in which there are respectively inserted cylindrical plugs having the nozzles therein, or the plate may be divided into two parts with the adjacent butting edges of the two parts being machined so that when the two parts are assembled, they together form the coanda nozzle. Also, the cylindrical plug may be molded of two parts.

DETAILED DESCRIPTION OF A PREFERRED EMBODIMENT

According to the broader aspects of the present invention, the apparatus and method disclosed herein are applicable to many different products as mentioned above and with different apparatus and methods for treating such products, further as mentioned above. The invention will be described with respect to a preferred embodiment relating to a specific product as an illustrative example. While the fluid used to form the fluid film through the coanda nozzle will be set forth below as being air, it is understood that according to the broader aspects of the present invention such fluid may be a reactant gas, which will chemically react with the product, may be a heated or cooled gas to provide for heat exchange with the product, may be a chemically inert gas, may be readily available air, or may be a carrier gas for other gas, liquid, or solid particles that are to interact with the product. While the preferred embodiment relates to the conveying of an indefinite length or continuous web, particularly of sheet material, it is to be understood that a plurality of sheets could be fed from a stack, or a plurality of articles could be fed from a stack, or the apparatus can be used in a stationary manner without feeding.

Figure 1:
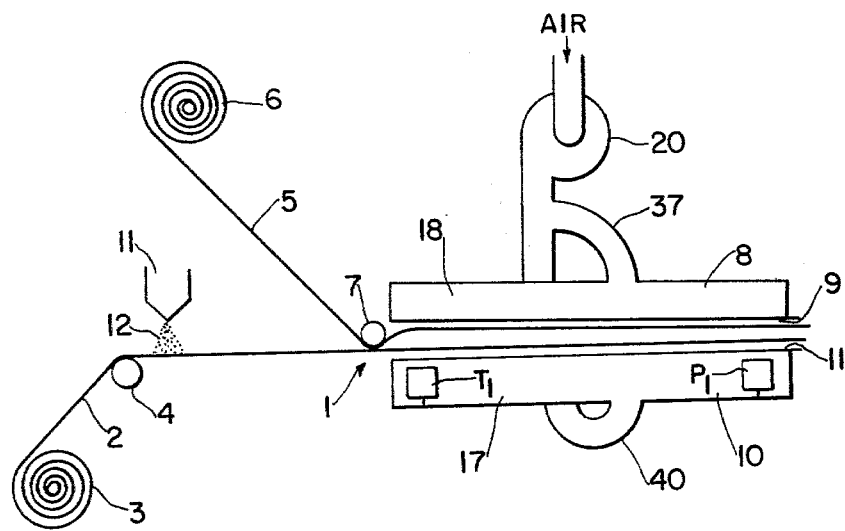
FIG. 1 is a side elevation view of an apparatus employing the present invention.

As shown in FIG. 1, apparatus 1 is shown for continuously treating an indefinite length of product. Specifically, a bottom cover sheet, which may be KRAFT paper 2 is fed from a coil of such paper 3 across a guide roller 4 in the direction of conveying from left to right in the figure so that it will travel along a processing path in parallel spaced relationship with respect to an upper cover sheet 5, which also may be of Kraft paper, metal foil, plastic, or the like fed from a storage coil of such material 6 across a guide roll 7, which guide roll 7 is located at the entrance end of the apparatus. Foamable synthetic resin materials are fed from a hopper 13 and a stream 12 onto the upper surface of the lower cover sheet 2 in such a manner that they will form on this cover sheet a web of foamable materials, which materials are well known in the art, and may be in fact a mixture of several chemicals that will foam to produce a closed cell rigid polyurethane. Preferably, the roller 7 is placed with respect to the cover sheet 2 so that the cover sheet 5 will engage the material 12 prior to any substantial foaming so as to wet the bottom surface of the cover sheet 5. Thereafter, the cover sheet 5 is lifted up downstream from the roller 7 by the supporting action of the apparatus to be described and conveyed in spaced apart relationship from the cover sheet 2 and now foaming material thereon, until such time as the foaming material fills such spacing so as to contact the previously wetted surface of the cover sheet 5 and form therewith a secure bond. If it is desired not to form a secure bond, the roller 7 would be spaced substantially above the cover sheet 2 so that it would not do the initial wetting action. The supporting apparatus includes an upper support member 8, having a support surface 9, a lower support member 10, having a support surface 11. Each of the support members 8 and 10 is preferably formed of welded sheet metal in a box configuration so as to provide the surfaces 9 and 11 as planar surfaces parallel to each other and at the same time form an interior pressure resistant plenum chamber 17 and 18 respectively. Preferably, a plurality of such support members 8 and 10, with a number being as needed, are placed end to end along the path of travel for the material as long as is necessary to support and process the material. A gas, as shown air, is pressurized by a centrifical blower 20 and fed into branch line 37 to the plenum chamber 18 and the branch line 40 to the plenum chamber 17, so as to pressurize said chambers and provide processing and supporting fluid as will be described below.

For automatic control of the fluid within the plenum chambers, as shown, apparatus may be provided to measure the temperature $T_1$ and the pressure $P_1$ within at least one of the plenum chambers and produce a correlated signal, which may be used in apparatus (not illustrated) for controlling the supply and characteristics of the gas being supplied to the pump 20.

Figure 2:
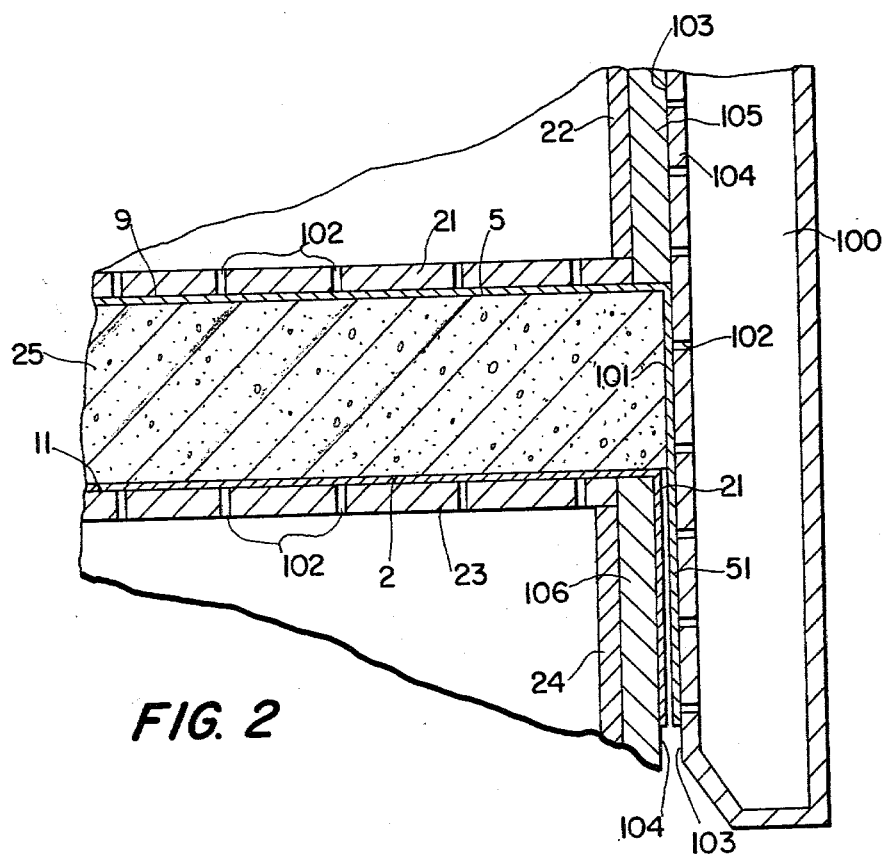
FIG. 2 is a partial cross-sectional view taken through the apparatus of FIG. 1 along a plane perpendicular to FIG. 1 showing the apparatus used with a specific product.

As shown in FIG. 2, the upper support member 8 is provided with a lower steel plate 21 welded to a side steel plate 22, while the lower support member is constructed of a steel plate 23 welded to a side steel plate 24. If desired, the processing path may be closed on its side by means of side dams, one of which is shown forming a plenum chamber 100 with a support surface 103 formed by one of the walls constructing such plenum chamber. The side edges of the cover sheets 2 and 5 are folded over as shown to form a continuous length envelope within which is contained the foamable material that forms the expanded foam 25. Different size spacers 105, 106 are used so as to provide specific orientations of their surfaces 104 offset with respect to each other so as to accommodate the side bent over portions 51 of the cover sheets 2 and 5 and permit their free travel within this space while preventing leakage of the expanded material 25.

One or more (all being shown) of the plenum chambers 100, 17 and 18 may be provided with aperatures 102 extending between the plenum chambers and the respective surfaces 9, 11, 103 to form a fluid film bearing between such surfaces and the adjacent portions of the cover sheets 2 and 5. While not shown in detail in FIG. 2, these aperatures are configured so as to constitute coanda effect nozzles.

Figure 4:
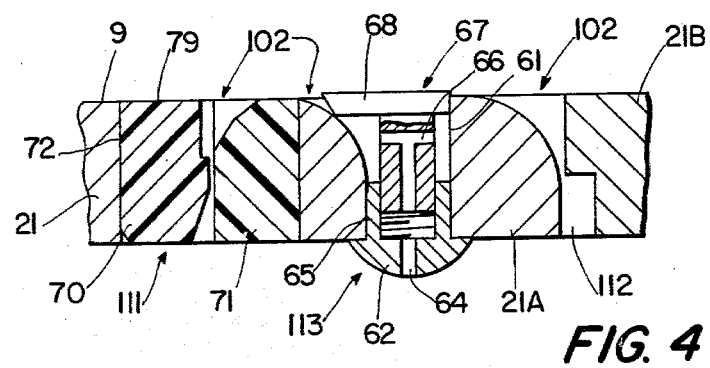
FIG. 4 is a cross-sectional view taken through the plate of FIG. 3.

In FIG. 4, there is an enlarged cross-sectional view of, for example, the plate 21 showing three adjacent aperatures 102, which three aperatures have different configurations. All of the aperatures in one support plate may have any combination of the specifically configured coanda nozzles 111, 112, or 103, or only one such configured nozzle, or a mixture of one or more configured nozzles with straight bores that do not provide a coanda effect but simply provide an air bearing.

Figure 3:
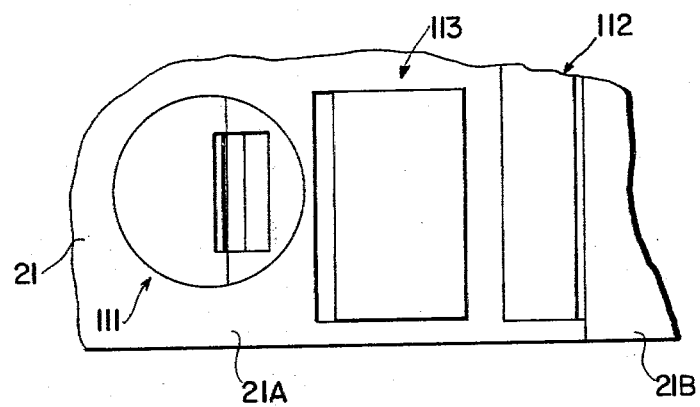
FIG. 3 is a plan view of a support plate showing three versions of coanda nozzles.

To form the coanda effect nozzle 112, the plate 21 may be divided into two separate plates 21A and 21B, the adjacent abutting edges of such plates 21A and 21B may be machined along a portion of their length so that when they are assembled they together form the coanda effect nozzle, and such machining may produce on the part 21A an air guide surface that starts from the lower side of the plate 21A at an angle greater than 45° (90° as shown) and transforms into an arcuate shape so as to merge with the support surface 9 at an acute angle, preferable less than 45° so as to produce a laminar flow of fluid from the right towards the left of FIGS. 3 and 4, while at the same time the adjacent edge of the plate 21B may be step machined along a corresponding part of its length so as to provide a through flow passage for the fluid, without providing any laminar flow in the opposite direction. It is further contemplated that this plate may not be subdivided and that a milling cutter may be used to form such a configured slot by milling opposite surfaces of the plate, or the plate may in fact be molded of plastic or the like so as to have such a through flow configuration.

The coanda nozzle 113 is of an adjustable type, in contrast to the fixed coanda nozzle 112 described above. The left-hand surface 60 of the aperature extending through the plate 21 is formed to have a configuration similar to the corresponding surface for the coanda nozzle 112, whereas the right-hand surface 61 of the slot for the coanda nozzle 113 is merely straight-sided preferably perpendicular to the surface 9. The coanda nozzle insert is preferably of a two-part construction, with a first part 62 having head 63 formed with a through bore 64 and a tool engaging surface (not shown), and a tubular shank 65 that is substantially the same diameter as the distance between the surfaces 61 and 64 that it engages. The interior of this tubular shank 65 is threaded for receiving a correspondingly threaded shank 66 of a second part 67. The second part 67 has a rectangular shaped end member 68 that is rigidly secured to the shank 66 so as to have one end in engagement with the side wall 61 and another end engaged with the side wall 60. It is seen that with rotation of the part 62, the part 67 will be moved towards and away from corresponding surface 60 so as to close and enlarge a slot between such parts for the escape of air along the surface 60 to form a laminar flow of air film along the surface 9 in the direction from right to left in FIG. 4. The shank 66 is formed when the plurality of air passages, so that air entering the hole 64 will blow through such passages in the shank 66, into the space between the shank 66 and the surfaces 60 and 61, and thereafter through the slot formed between the member 68 and the surface 60. It is seen that air pressure within the aperature 64 will cause the assembly 62, 67 to move upwardly, if it moves at all, to open up such slot between surface 60 and the part 68. It is further contemplated that the aperature through the plate 21 may be annular with a uniform cross-section formed by a revolution of the surface 60, and that the part 68 may be a disc, so that the coanda nozzle formed thereby will produce a radially expanding laminar flow of air film along the surface 9.

It is noted that the nozzles 112 and 113, which are adjacent each other, provide a directional laminar flow of the air film, which is desirable when material is to be conveyed in such direction, preferably for the purposes of conveying, all of the coanda effect nozzles would be directional, with a common direction of laminar flow. However, if conveying is not desired, the above mentioned modification of the coanda nozzle 113 may be employed for radial flow, or two directional coanda effect nozzles, such as 111 and 113 may be mounted adjacent each other so as to provide flow towards each other, or (as not shown) such nozzles may be placed adjacent each other and produce laminar flow in opposite directions. Further, it is contemplated that a central number of the nozzles, with respect to the direction of flow, may all be aligned in the direction of flow to provide a predominant conveying force on the material in the direction of flow, while on each side coanda effect nozzles may be mounted to provide a directional air film perpendicular or at an angle to the direction of flow in an outward direction so as to stretch or hold taut a sheet material as it is moved.

Figure 5:
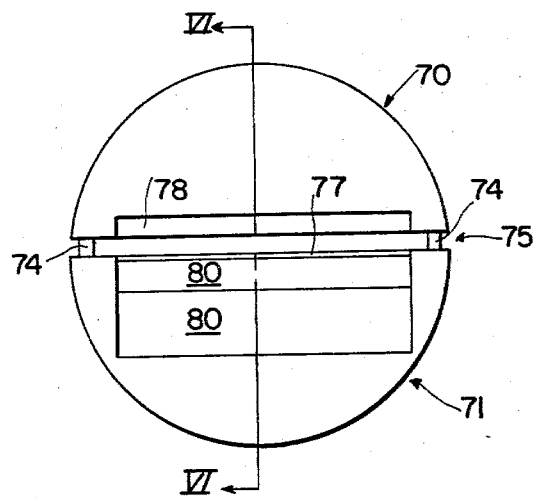
FIG. 5 is an enlarged plan view of the cylindrical product used to form one of the nozzles shown in FIG. 3.
Figure 6:
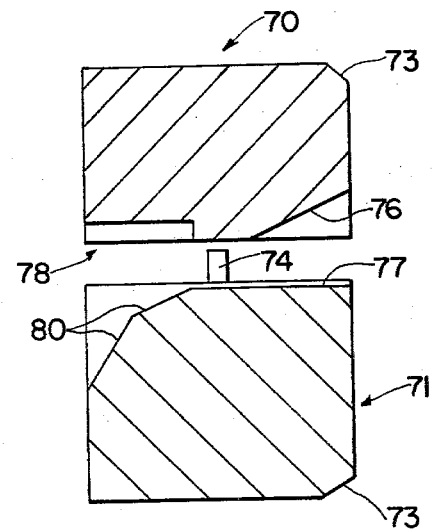
FIG. 6 is a cross-sectional view taken along line VI—VI of FIG. 5.

The coanda effect nozzle 111 is formed of two parts 70 and 71, which are preferably molded and shown on an enlarged scale in greater detail in FIGS. 5 and 6. The position of the parts in FIG. 6 is exploded with respect to their assembled position in FIG. 5.

As shown in FIG. 5, the assembled parts 70 and 71 have an outer periphery that is cylindrical and generally the same size as or slightly larger than a through bore 72 in the plate 21 as shown in FIG. 4, for a tight or interference fit. To assist in assembly, the entire periphery of the cylindrical plug formed by the members 70 and 71 is provided with a chamfer 73 at one end so as to assist in assembly. Also, it is desirable to have one of the parts, 71 as shown, provided with one or more projections 74 adjacent its mid-plane that is perpendicular to the cylindrical axis for engaging the other part (70 as shown) so as to provide a spacing 75 between such parts 70 and 71. Preferably, the other part 70 is provided with mating holes, of less depth and length of the projection 74, for accuracy of assembly. Also, the projection 74 will form a pivotal connection between the parts 70 and 71, so that they may pivot upon an axis perpendicular to FIG. 6 and extending through the projection 74, which will further assist in assemblying the cylindrical plug within the bore 72. Further, these projections 74 will form somewhat resilient means to be compressed with the force fit assembly of the cylindrical plug within the bore 72. The part 70 is provided with a first angled surface 76, the angle of which is not important, for the entrance of the gas to the nozzle, although the angle must be sufficient so as to provide for sufficient flow of the gas. The same part 70, or as shown the part 71, may be provided with a slight recessed portion 77 so as to assure that there will be some flow of fluid between the parts 70 and 71 no matter how small the space 75 becomes, although this is not necessary. The critical portion of the nozzle is formed at the opposite end, where the surface 78 is formed at an angle greater than 45°, preferably 90° as shown, with respect to the support surface 79 of the plug, and the immediately adjacent surface 80 of the part 73 is provided as a transition surface so as to direct the flow of fluid and change its course from a course perpendicular to the surface 79 to a course parallel to the surface 79. Although this surface 80 may be arcuate in a manner similar to the surface 60 of the nozzle 113, it may be also composed of a number of (two being shown) angled planar surfaces approximating such arcuate shape. In this manner, a directional flow for the fluid film is obtained.

The inventors have found that with such a directional flow obtained with a coanda effect nozzle, there are two primary functions. The first function is that of forming an air bearing that would prevent contact directly between the material and the surface 9, and the second function is that after a certain minimum spacing from the surface 9, there is formed a suction that increases and thereafter decreases with further increasing of the spacing, so as to provide a support suction that will hold the material closely adjacent the support surface 9. In this manner, if the support surface 9 is facing downwardly, the material may be held upwardly closely adjacent the support surface 9 against the force of gravity, or when the support surface 9 (specifically with respect to the support surface 11) is facing upwardly, the material may be held downwardly closely adjacent the support surface 11 against extraneously applied external forces that would otherwise move or deform the material upwardly. If the directional coanda effect nozzles are aimed so as to produce a predominate directional flow of the fluid film, a third function will be produced, that is a function of conveying the material in such direction. Of course, additional functions, as mentioned above, may be provided by the fluid film itself, for example with respect to heating, cooling, chemical reaction, drying, coating, or the like.

The term coanda effect nozzles as used herein refer to nozzles that will receive a fluid, either gas or liquid, but preferably gas, at one end and pass the fluid to the other end, with such nozzle diverting towards the other end so that the fluid will move towards one or more of the surfaces as the opening enlarges and due to the shape of such surface, the fluid will continue to follow such surface, with the surface blending into a greater surface of the support wall so that the fluid will continue to follow the greater surface of the support wall so long as the fluid is not otherwise disturbed. By following the surface, it is meant that the fluid is "locked" onto the surface as it moves along the surface in the manner of a defined width jet with respect to directional nozzles, or with respect to an increasing width fan, or in the nature of a point source wave propagation with respect to a circular nozzle wherein the periphery expands as you move radially from the nozzle. Except for adjustment of some of the nozzles, there are no moving parts, and in any event, there are no moving parts necessary to control the flow of the fluid, with such flow control being solely accomplished by the shape of the nozzle and support surface adjacent the nozzle. That is, a coanda effect nozzle is a fluid flow nozzle that produces a coanda effect with respect to the fluid with respect to the nozzle surface and the adjacent support surface.

While a preferred embodiment of the present invention has been described in detail for purposes of illustration and the advantages of the specific details thereof, broader aspects of the present invention are contemplated with respect to variations, modifications and further embodiments, all as encompassed by the spirit and scope of the following claims.

I claim:

1. Apparatus for continuously molding a web of foam synthetic resin material, comprising:
    means for dispensing material that will foam and expand to form a generally continuous web;
    lower support means having an entrance end adjacent said dispensing means and an exit end, and operatively associated with said dispensing means for supporting said web of material and moving said web of material along a processing path from said entrance end to said exit end where it will expand and cure adjacent said exit end;
    upper support means operatively associated with said lower support means and being spaced from said lower support means along said path so that when said material is expanded, said material will be confined between said upper and lower support means;
    sheet feeding means operatively associated with said upper support means for feeding an indefinite length of cover sheet along said upper support means to overly said web of material as said web of material moves along said path, with said cover sheet being between said web of material and said upper support means;

said upper support means including a gas plenum chamber for containing therein gas under pressure;

means operatively associated with said plenum chamber for supplying gas under pressure to within said plenum chamber; and coanda effect nozzle means providing through apertures between said plenum chamber and the space between said cover sheet and said upper support means for exhausting the gas in a flat jet along and attached to the lower surface of said upper support means for creating a suction along said surface adjacent said entrance end to support said cover sheet in spaced relationship upwardly from said web during initial stages of expansion of said web.

2. The apparatus of claim 1, wherein said upper support means has a plurality of aperture means extending from said chamber to the space between said upper and lower support means providing an air bearing between said cover sheet and said upper support means adjacent the exit end of the path for resisting the full expansion pressures of the foamed material and generally maintaining said upper cover sheet out of frictional contact with the adjacent surface of said support means.

3. The apparatus of claim 1, further including means operatively associated with said feeding means and dispensing means for contacting the cover sheet with said web of material closely adjacent said dispensing means prior to substantial expansion of said material so as to wet a surface of said cover sheet adjacent said web of material with the material prior to substantial expansion of said material and prior to said cover sheet being supported by said coanda nozzle means so that upon subsequent full expansion of said web of material into contact with said cover sheet held by said coanda nozzle means there will be formed a secure bond between the material and cover sheet.

4. The apparatus of claim 1, wherein said nozzle means comprises a plurality of bores extending through the surface of said upper support means into said chamber, a corresponding plurality of individual nozzles respectively in said bores, with each of said nozzles including a cylindrical plug substantially of the same diameter as its corresponding bore, said plug being divided into two parts, with a first part having a first surface that changes toward said lower surface from substantially perpendicular to substantially parallel to the lower surface of said upper support means and opening outwardly in the direction of travel of said web, and said second part having a surface opposed to the first surface of said first part and forming an angle greater than 45° with respect to the lower surface of said upper support means, and said first and second parts forming between than an air channel for feeding air from said plenum to said first surface.

5. The apparatus of claim 4, wherein said plug is divided into said two parts along a generally axial plane, said two parts having projection means extending between them and forming the only normal contact between said parts closely adjacent a mid plane perpendicular to the plug axis, so as to space the remainder of said two parts from each other so as to form said air channel and to permit limited relative pivoting of said two parts relative to each other about an axis perpendicular to the cylindrical axis of said plug for ease of assembly.

6. The apparatus of claim 5, wherein the outer peripheral surface of said cylindrical plug adjacent the axial end opposite from said first surface is chamfered for assisting the assembly of said plug within its bore.

7. The apparatus of claim 1, wherein each of said coanda nozzle means includes a slot extending transversely to the direction of travel of said web and extending through the bottom surface of said upper support means, and having a gas guiding surface immediately adjacent said lower surface on the downstream, with respect to the travel of the web, side of said coanda nozzle means that changes toward said lower surface from substantially perpendicular to substantially parallel to the lower surface.

8. The apparatus of claim 7, wherein said upper support means includes a first lower plate machined with said guiding surface and a second lower plate abutting said first plate to form therebetween said nozzle means.

9. Apparatus for continuously processing web material, comprising:

wall means forming a fixed plenum chamber having a guide surface extending in one direction from an entrance end to an opposite exit end to define an adjacent fixed path in said one direction from said entrance end to said exit end;

feeding means operatively associated with said fixed plenum chamber for feeding an indefinite length of web material along said guide surface in said one direction from said entrance end of the guide surface to said exit end of the guide surface;

means for supplying compressed gas to within said plenum chamber; and coanda effect nozzle means in said guide surface and having a through passage extending in fluid communication with said plenum chamber through said guide surface and opening into said guide surface for passing the compressed gas from within said plenum chamber through said guide surface and exiting the compressed gas along and attached to said guide surface so as to produce a suction for biasing the web towards said guide surface, for supporting said web closely adjacent said surface and simultaneously for forming an air bearing for preventing contact between said guide surface and said web.

10. The apparatus of claim 9, wherein said nozzle means direct the flow of gas along said surface predominately in one direction for exerting a conveying force on said web in the direction of travel of said web along said path and providing the sole conveying forces on said web.

* * * * *